United States Patent [19]

Peifer et al.

[11] Patent Number: 5,778,351

[45] Date of Patent: Jul. 7, 1998

[54] METHOD FOR STORING SYSTEM COMMUNICATIONS SYSTEM DATA USING MODULES AND TABLES

[75] Inventors: Juergen Peifer; Andreas Hammerschick; Claus Ahlers, all of Munich, Germany

[73] Assignee: Siemens Aktiengesellschaft, Munich, Germany

[21] Appl. No.: 603,028

[22] Filed: Feb. 16, 1996

[30] Foreign Application Priority Data

Mar. 16, 1995 [DE] Germany ............... 195 09 603.7

[51] Int. Cl.[6] ............................................ G06F 17/30
[52] U.S. Cl. ........................ 707/1; 707/100; 707/102; 707/104
[58] Field of Search ............................... 395/601, 613, 395/615, 611, 200.11, 200.01, 200.06, 608; 707/1, 100, 102, 104

[56] References Cited

U.S. PATENT DOCUMENTS

| | | | |
|---|---|---|---|
| 4,458,316 | 7/1984 | Fry | 395/872 |
| 5,018,097 | 5/1991 | Kuhlmann et al. | 395/680 |
| 5,448,566 | 9/1995 | Richter et al. | 370/431 |
| 5,471,474 | 11/1995 | Grobicki et al. | 370/437 |
| 5,649,102 | 7/1997 | Yamauchi | 395/200.43 |
| 5,659,794 | 8/1997 | Caldarale et al. | 395/821 |

OTHER PUBLICATIONS

Oracle& Server Concepts Manual; pp. 5-11 to 5-17, The Oracle Corporation, Redwood City, CA 94065, Dec. 1992.

*Primary Examiner*—Paul R. Lintz
*Assistant Examiner*—Diane D. Mizrahi
*Attorney, Agent, or Firm*—Hill & Simpson

[57] ABSTRACT

In communications systems the problem often arises of memory-efficient intermediate storage of system data. To solve this problem, the invention provides that during the process of generating the control programs for the communications system at least one table is created of such a type that the system data to be written into the same during the execution of these programs are intermediately stored without reserving additional memory space and without larger dynamic loss.

4 Claims, 1 Drawing Sheet

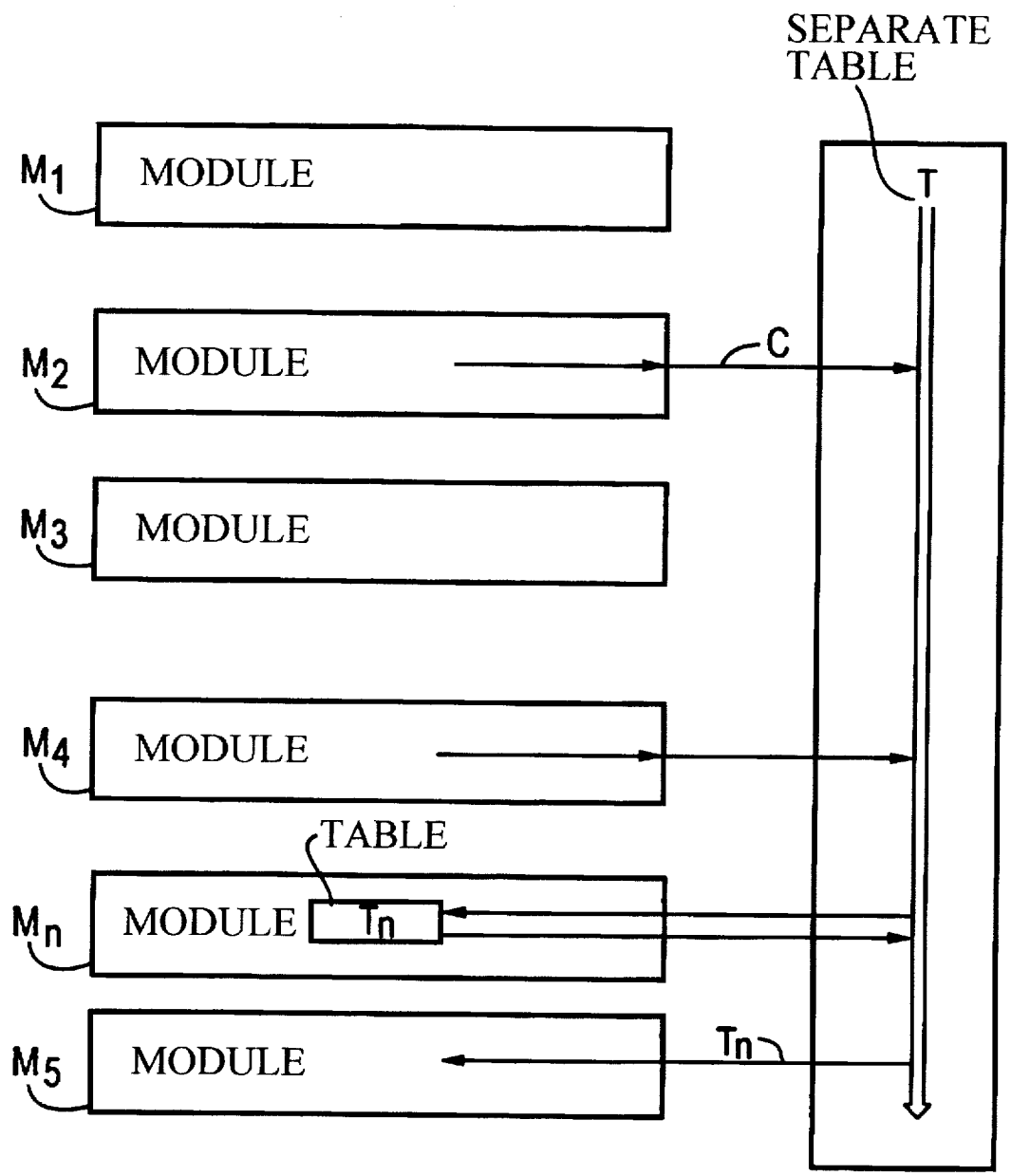

METHOD FOR STORING SYSTEM COMMUNICATIONS SYSTEM DATA USING MODULES AND TABLES

BACKGROUND OF THE INVENTION

The invention concerns a method for storing system data for a communications system.

In communications systems, system data must be intermediately stored for the handling of control and switching processes in the system. This involves, for example, status data giving information about the current state of the communications system. As a rule, these processes are partly carried out via extensive tables. Thus several installations of the communications system, or the programs that control these, enter their system data in the fields provided for this purpose. At the same time, or at a later time, these system data are then read by further programs and are further processed. In the face of an ever-increasing throughput of system data of this sort, the problem arises in particular of how such tables are to be dimensioned.

A possibility often used in the prior art is that in the coding phase it is already defined which system data are to be stored in which fields of the tables. A problem here is that already at this stage an extensive coordination of the individual programs describing the table is required, which as a rule requires an additional expenditure. Moreover, for the further programs later to come there must be sufficient memory reserves available for the intermediate storage of these further system data. However, unnecessary memory space is associated with this.

A further possibility for circumventing problems of this sort is the allocation, already during the coding phase, of an insertion procedure to the programs that access tables of this sort. In this case, during the later execution of these programs the same programs are called and provided with the corresponding system data. The insertion procedures then access the relevant fields of the tables and store the system data. However, here the problem arises that the calling of the insertion procedures by the programs must be coordinated, because a simultaneous accessing of the same field of a table by two or more procedures must be avoided. However, a coordination of this sort requires further programs and procedures as well as additional memory space. To this extent a dynamic loss during the execution of the software as a whole is inevitably associated with a solution proposal of this sort.

SUMMARY OF THE INVENTION

An object of the invention is to disclose a method whereby system data can be intermediately stored in tables in a way that makes efficient use of memory space without limiting the dynamics of the communications system.

According to the invention, a method is provided for storing system data for a communications system. A plurality of modules are converted in a defined generation sequence into programs by a procedure that defines a generation process, the programs after the generation process and during execution carrying out write/read operations on system data in at least one table. A module of the plurality of modules which occupies a last position before modules with read access in the generation sequence is provided with the at least one table. During the generation process for the modules other than the module having the at least one table, entries are made in a separate table which give information concerning which of the modules other than the module having the at least one table will carry out write/read operations in the at least one table, and which fields of the at least one table should be written to. Before the generation process of the module having the at least one table, taking the entries in the separate table and using them in the creation of the at least one table.

The invention has the particular advantage that one or more tables are first created during the generation process of the programs controlling the communications system. For this purpose, before the generation process a generation sequence is defined for the modules of a program. Thus the module, having at least one table, is placed at the last position in the generation sequence before the modules with read access. This means that this module is generated last. The advantage here occurs that in this phase a memory-optimized dimensioning is possible. Also, no insertion procedures that enter system data into the fields of the table or read them from these fields are necessary, which causes no reduction with respect to dynamics. A further advantage occurs, in that errors that may arise—such as for example a simultaneous access of several modules to the same fields—can be calculated early on, namely during the generation phase. These can thus still be rectified quickly and by relatively simple structure. By comparison, in the prior art these errors first come to light later, namely during the execution of the program. In practice, this means the software is easy to maintain.

In one aspect of the invention, the entries in the separate table define system data and addresses.

In another aspect of the invention, the system data are status data of the communications system and/or subscriber-related data. The advantage occurs that memory-optimized intermediate storage is also possible for other types of data.

BRIEF DESCRIPTION OF THE DRAWINGS

The drawing Figure illustrates the method of the invention for storing system data for a communications system.

DESCRIPTION OF THE PREFERRED EMBODIMENTS

In the drawing Figure modules $M_1 \ldots M_n$ are shown, whereby a module respectively comprises a determined number of program steps. For n=5, these are the modules $M_1 \ldots M_5$. A separate table T is further defined that is constructed by a generation procedure C. In the present exemplary embodiment, the system data are to be intermediately stored in a table $T_n$ of the module $M_n$. In the following it shall be assumed that modules $M_2$ and $M_4$ carry out write/read operations of system data in the tables $T_n$.

For this purpose, before the generation process a generation sequence is first defined. This definition occurs by means of the procedure C or, if warranted, a separate procedure. Thus, the module comprising the table $T_n$ is placed at the last position in the sequence.

After the definition of the sequence, the modules $M_1$ to $M_{n-1}$ are generated by means of the sequence defined in procedure C. In the present exemplary embodiment, the generation process is thus started with module $M_1$. During the generation process calculations are performed by procedure C to determine whether accesses, in the sense of read/write operations on the tables $T_n$ by the program generated from module $M_1$, should occur. This is not the case in the present exemplary embodiment. To this extent, procedure C also makes no entry in the separate table T (which comprises the function of a data base).

After the generation process of module $M_1$ is complete, module $M_2$ is generated by procedure C. In the present exemplary embodiment, it is assumed that from here write operations in the table $T_n$ of module $M_1$ are to be carried out. This circumstance is verified by procedure C, and an entry in table T is subsequently made. The remaining modules $M_3$ to $M_{n-1}$ are generated by procedure C in a corresponding fashion.

When the modules $M_1$ to $M_{n-1}$ have been generated, table T has all the entries where read/write operations are to be carried out. As the final step, module $M_n$ is now converted. Procedure C now takes all the entries from separate table T, and, using this information, forms table $T_n$. The advantage thereby occurs that table $T_n$ on the one hand does not have to be overdimensioned with respect to memory space used, since all entries are known. Furthermore, with a procedural method of this sort a particular dynamic gain is associated. Additionally, possible errors are already calculated during the generation phase and are therefore already correctable at an early stage. This is an essential advantage in comparison to the prior art, since there errors can only first be calculated later, during the execution of the already-generated programs.

In conclusion, let it be noted that the usefulness of the invention is not limited to system data for communications systems. Other types of data, e.g. customer data, can just as well be correspondingly managed in a way that makes efficient use of memory space.

In conclusion, in the present exemplary embodiment only one table $T_n$ is addressed. However, this does not represent a limitation, since a number of tables can also be generated with the method according to the invention.

Although various minor changes and modifications might be proposed by those skilled in the art, it will be understood that our wish is to include within the claims of the patent warranted hereon all such changes and modifications as reasonably come within our contribution to the art.

We claim as our invention:

1. A method for storing system data for a communication system, wherein a plurality of modules are converted into programs by a procedure that defines a generation process, said programs then carrying out write/read operations on system data with at least one table during execution of said programs, comprising the steps of:

defining said procedure for generating said plurality of modules where each module will have a predetermined number of program steps, a last position of said procedure being assigned to a module having said at least one table in which system data are to be stored, and wherein a separate table is defined which will be constructed by said procedure;

generating said plurality of modules by said procedure wherein the procedure starts by generating a first of the plurality of modules and calculates whether accesses as read/write operations on said at least one table by a program generated from said first module should occur, and whether or not an entry is to be made in said separate table, and thereafter generating the remaining modules of said plurality of modules corresponding to the generation of the first module so that the separate table acquires all entries where said read/write operations are to be carried out; and with said procedure, now generating said module having said at least one storage table by taking all of the entries from said separate table, and by use of said entries, defining said at least one table.

2. The method according to claim 1 wherein the entries in said separate table define system data and addresses.

3. The method according to claim 1 wherein the system data are status data of the communication system.

4. The method according to claim 1 wherein the system data are status data of the subscriber-related data.

* * * * *